(12) United States Patent
Ullakko et al.

(10) Patent No.: US 8,966,991 B2
(45) Date of Patent: Mar. 3, 2015

(54) SENSOR DEVICE

(71) Applicant: Boise State University, Boise, ID (US)

(72) Inventors: Kari Ullakko, Savonlinna (FI); Kotaro Sasaki, Boise, ID (US); Peter Müllner, Boise, ID (US)

(73) Assignee: Boise State University, Boise, ID (US)

( * ) Notice: Subject to any disclaimer, the term of this patent is extended or adjusted under 35 U.S.C. 154(b) by 250 days.

(21) Appl. No.: 13/652,293

(22) Filed: Oct. 15, 2012

(65) Prior Publication Data

US 2013/0091954 A1    Apr. 18, 2013

Related U.S. Application Data

(60) Provisional application No. 61/547,611, filed on Oct. 14, 2011.

(51) Int. Cl.
*G01B 7/16* (2006.01)
*G01L 1/12* (2006.01)

(52) U.S. Cl.
CPC ..................................... *G01L 1/127* (2013.01)
USPC ............................................... 73/777; 73/779

(58) Field of Classification Search
CPC ....... G01F 15/066; H01L 41/125; G01B 7/24; G01L 1/12
USPC ............................................ 73/760, 777, 779
See application file for complete search history.

(56) References Cited

U.S. PATENT DOCUMENTS

| 4,579,006 A | * | 4/1986 | Hosoda et al. ............ 73/862.381 |
| 7,047,826 B2 | * | 5/2006 | Peshkin ...................... 73/862.53 |
| 7,648,458 B2 | * | 1/2010 | Niwa et al. .................... 600/130 |
| 7,905,824 B2 | * | 3/2011 | Schneider et al. ............... 600/25 |
| 7,931,081 B2 | * | 4/2011 | Sponchia .................. 166/250.11 |
| 2004/0261544 A1 | * | 12/2004 | Peshkin ...................... 73/862.53 |

* cited by examiner

*Primary Examiner* — Max Noori
(74) *Attorney, Agent, or Firm* — Parsons Behle & Latimer

(57) ABSTRACT

An apparatus for sensing strain or stress includes a body including magnetic shape-memory alloy (MSMA) material, having a first axis. A first drive coil and first sensor coil are wound around the body about the first axis. The drive coil is coupled to a power source and configured to generate an alternating magnetic field on the body. The first sensor coil is configured to detect changes in inductance of the body due to changes in magnetic permeability of the body with deformation thereof.

32 Claims, 3 Drawing Sheets

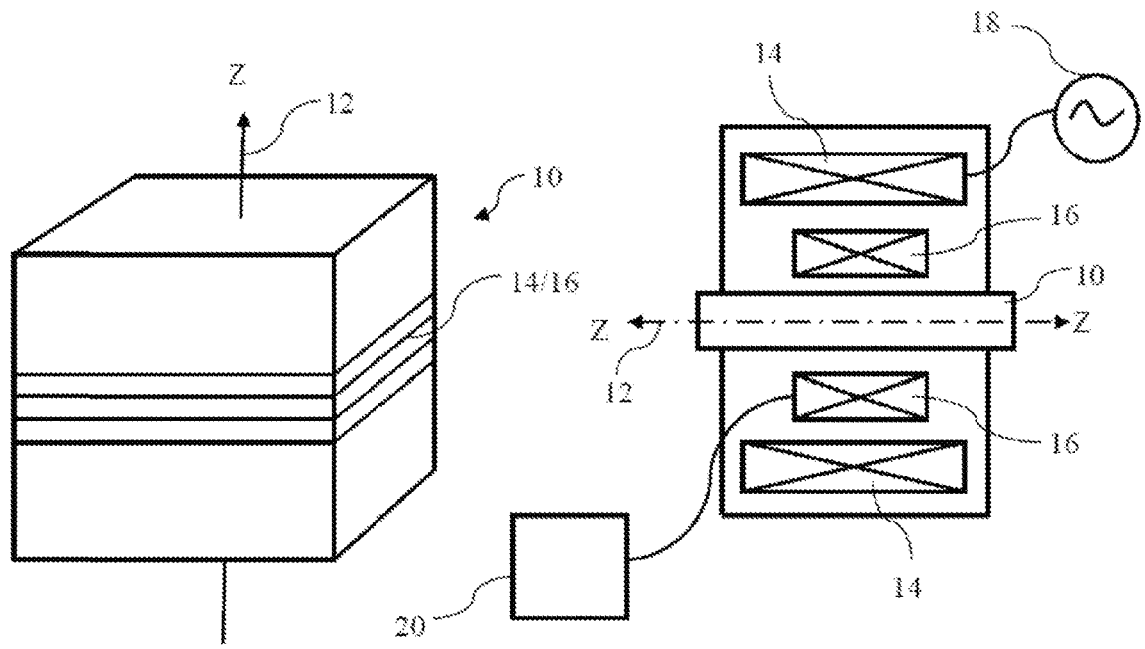
FIG. 1A  FIG. 1B
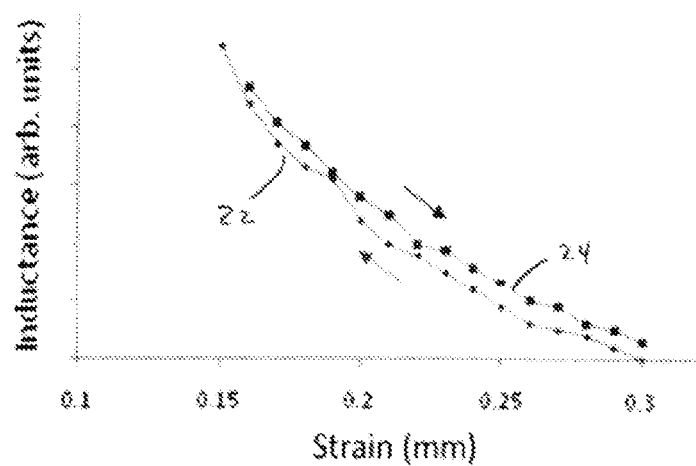
FIG. 2

SENSOR DEVICE

PRIORITY CLAIM

The present application claims priority from U.S. Provisional Patent Application Ser. No. 61/547,611, filed on Oct. 14, 2011 and entitled SENSOR DEVICE, the disclosure of which is incorporated herein by reference in its entirety.

BACKGROUND

The present application generally relates to devices for detecting mechanical strain. More particularly, the present application relates to a strain sensor that can detect strain based on changes in magnetic permeability of magnetic shape-memory alloy material with deformation. The apparatus can detect strain in one, two or three dimensions, and all six components of the strain tensor, and can also be used to detect mechanical stress and all six components of the stress tensor.

Low back pain and osteoarthritis are typical examples of musculoskeletal injury and disease affecting a vast number of people. Approximately 69 million and 27 million patients, respectively, suffer from these disabling conditions in the United States alone. Mechanical loading analyses are useful in identifying both the causes of these conditions, as well as appropriate prevention and treatment strategies. For example, by examining patients as they walk, researchers have been able to use mechanical loading analysis to identify an important link between patient knee adduction joint moments and prevalent medial knee joint osteoarthritis.

It is difficult to perform loading analyses without knowing how and to what extent external forces act on body segments. Consequently, it is desirable accurately to measure external forces in three dimensions. Such macroscopic biomechanical loading information is also helpful in cell- or tissue-level analyses to estimate realistic in vivo microscopic loading conditions.

Unfortunately, external force measurements are not always straightforward, especially when obtaining reaction forces during dynamic motor activities. This is because researchers can usually only gather uninterrupted force information when a subject constrains his or her motor activity to always interact with an embedded sensor. Using floor-embedded force platforms to gather Ground Reaction Force (GRF) data during biped activities is a typical approach. These types of facilities sometimes offer limited data quality and quantity. For example, floor-embedded force platforms can suffer from contact problems, present unrealistic conditions, and only give short duration data. Additionally, while insole pressure sensors are currently available, many devices that are currently available detect only a single, vertical force component. With this information, it is difficult for researchers to obtain accurate, clinically relevant kinetic variables such as joint moments and joint contact forces, which can be used to examine a variety of injuries and diseases such as joint and connective tissue injuries, osteoarthritis, and motor dysfunctions such as cerebral palsy, stroke, and Parkinson's disease.

The present disclosure is directed to addressing one or more of the above issues.

SUMMARY

It has been recognized that it would be advantageous to develop a device for GRF measurement that can be used outside of a laboratory or clinical setting.

It has also been recognized that it would be advantageous to develop a device for GRF and other stress or strain measurement that obtains high quality three-dimensional data.

It has also been recognized that it would be advantageous to develop a device for stress and/or strain measurement that is simple and robust.

In accordance with one aspect thereof, the present application discloses an apparatus for sensing strain and stress, including a body of magnetic shape-memory alloy (MSMA) material, having a first axis. A first drive coil and first sensor coil are wound around the first axis. The drive coil is coupled to a power source and configured to generate an alternating magnetic field on the body. The first sensor coil is configured to detect changes in inductance of the body due to changes in magnetic permeability of the body with deformation thereof.

In another embodiment, the apparatus includes second and third drive coils, wound around second and third axes of the body, respectively, coupled to the power source and configured to generate an alternating magnetic field on the body, the first, second and third axes being oriented substantially perpendicular to each other. Second and third sensor coils are wound around the second and third axes, respectively, and configured to detect changes in inductance of the body due to changes in magnetic permeability of the body with deformation thereof.

In accordance with another aspect thereof, the present application discloses a wearable strain-sensing device, including a plurality of sensor elements, integrally disposed in the wearable device. Each sensor element includes a body of MSMA-elastomer composite material, having a first axis, a first drive coil, wound around the first axis, coupled to a power source, and a first sensor coil, wound around the first axis. The drive coil is configured to generate an alternating magnetic field on the body, and the sensor coil is configured to detect changes in inductance of the body due to changes in magnetic permeability of the body with deformation thereof. The wearable device can be, for example, a shoe, a shoe insole, and a glove.

In accordance with yet another aspect thereof, the present application discloses a method for making a strain sensor. The method includes embedding an MSMA material in an elastic medium, and wrapping a first drive coil and a first sensor coil around a part of the elastic medium around a first axis. The method further includes connecting the first drive coil to an alternating current source and connecting the first sensor coil to circuitry for sensing changes in inductance of the first sensor coil, said changes being indicative of deformation of the elastic medium relative to the first axis.

These and other embodiments of the present application will be discussed more fully in the description. The features, functions, and advantages can be achieved independently in various embodiments of the claimed invention, or can be combined in yet other embodiments.

BRIEF DESCRIPTION OF THE DRAWINGS

FIG. 1A is a perspective view of an embodiment of a one-dimensional sensor in accordance with the present disclosure.

FIG. 1B is a cross-sectional view of the sensor of FIG. 1A.

FIG. 2 is graph of coil inductance vs. strain for a coil with MSMA material in its core.

DETAILED DESCRIPTION

Figure 3:
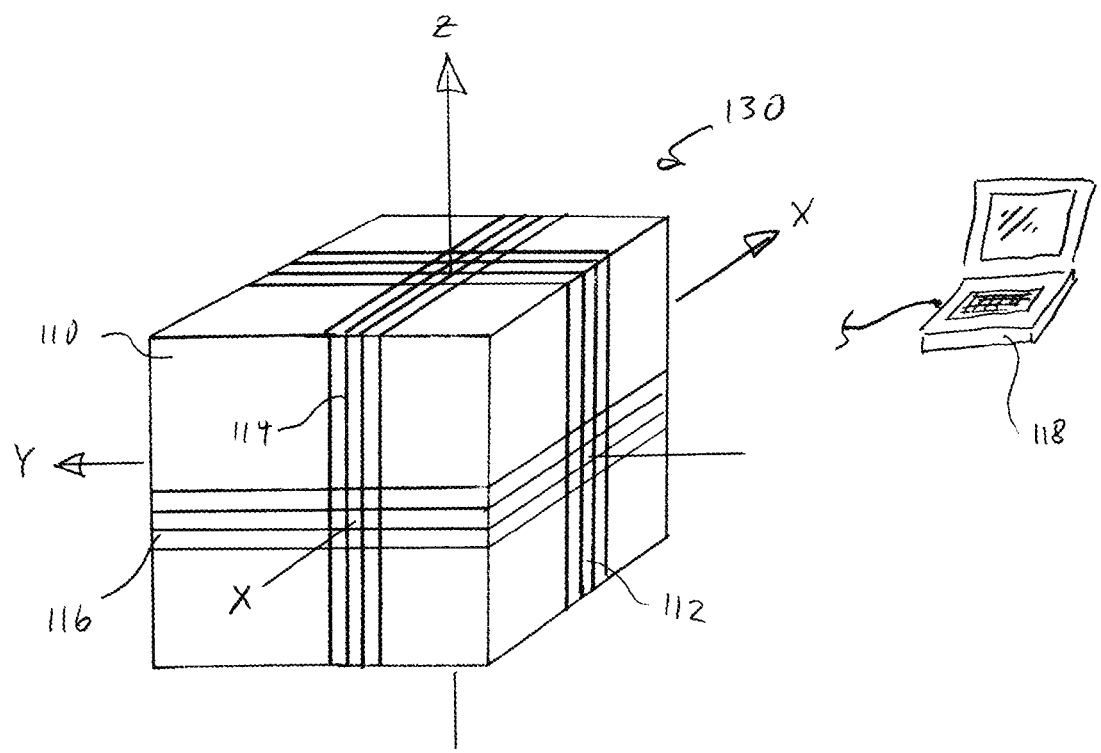
FIG. 3 is a perspective view of an embodiment of a three-dimensional sensor in accordance with the present disclosure.

Illustrative embodiments are described below as they might be employed in an apparatus for sensing strains in three dimensions. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments will become apparent from consideration of the following description and drawings. These embodiments are described in sufficient detail to enable those skilled in the art to practice the invention, and it is to be understood that modifications to the various disclosed embodiments can be made, and other embodiments can be utilized, without departing from the spirit and scope of the present invention. The following detailed description is, therefore, not to be taken in a limiting sense.

As noted above, force measurements during biped motor activities are frequently detected using floor-embedded force platforms to collect GRF data. Though standard in many biomechanical analyses, these platforms have some shortcomings. First, they can suffer from contact problems. That is, subjects' feet may fail to make contact with platforms when walking or performing other dynamic movement. Unsuccessful contacts lead to repeated trials, which may be a burden for frail patients in pain, or for small children. Treadmills with embedded force plates can eliminate this problem, but this use is limited to gait analyses.

Another potential problem with floor-embedded force platforms and other current methods is unrealistic conditions, as suggested above. It is very difficult to measure GRF during vigorous and injury-prone athletic activities such as basketball, soccer, football, and skiing, under earnest conditions. Forcing an athlete to adjust his pitch, or a child to curtail typical physical behavior, for example, imposes unrealistic conditions.

One additional potential problem with conventional GRF measurements is short duration. Lab floor-embedded force platforms do not allow one to measure GRF continuously during daily and/or outdoor activity in the long term. However, such measurements would offer insight into the cumulative effects of musculoskeletal loading on injuries and on chronic diseases. The availability of ongoing data from an osteoarthritis patient moving through the day, week, month, or year would be very helpful, but is not currently available.

Insole pressure sensors are currently available that measure stress on the foot of a wearer. However, such devices that are currently available detect only a single, vertical force component, and do not allow researchers to calculate accurate joint moments or joint contact forces frequently used in clinical biomechanics. The limitations presented above tend to reduce the opportunities for improving the understanding and treatment of musculoskeletal injury and disease.

Advantageously, as disclosed herein, a sensor has been developed that can provide much more clinically pertinent data. In one embodiment, the sensor device disclosed herein can sense strains in three orthogonal directions based on strain-induced magnetic permeability changes of magnetic shape-memory alloy materials. The sensors disclosed herein can also be dispersed throughout an elastic media, thus detecting strain distribution in a large area.

Shown in FIG. 1A is a pictorial view of a one-dimensional sensor in accordance with the present disclosure. A cross-sectional view of the same sensor is shown in FIG. 1B. This sensor includes a body 10 including magnetic shape-memory alloy (MSMA) material. Those of skill in the art will recognize that the magnetic shape-memory effect arises through the magnetic-field-induced motion of twin boundaries, which enable MSMAs to be used as linear actuators.

The distinct and well-known characteristics of MSM actuators include that: (1) they have a stroke length nearly 100 times longer than piezo-electric materials; (2) they have a fast response time (~0.1 ms); (3) they provide large work output (e.g. about 100 kJ/m$^3$); (4) they offer high position accuracy (in the nanometer-range); (5) they offer high dynamic range (stroke/accuracy, ~10$^6$); (6) they consume little power (because power is required only intermittently); and (7) they are of a simple and reliable construction. MSMA materials can also be used in strain and acceleration sensors and vibration dampers. Nickel-manganese-gallium (Ni—Mn—Ga) alloys are the largest group of MSM materials. MSM materials have been produced as single crystals, polycrystalline porous structures (foam), polycrystalline fibers, coarse grained polycrystalline bulk materials, and metal/polymer composites where the metal has been made in the form of powders and fibers.

As noted above, magnetically controlled shape memory alloys (MSMA) produce large strokes when subjected to a magnetic field. Conversely, when those materials are strained, e.g., elongated or contracted, the magnetic circuit around the piece of the MSMA material generates electrical power. This is sometimes referred to as the reverse effect of MSMA materials, i.e., the strain-induced change of magnetization. When the MSM element is strained, magnetic permeability varies due to reorientation of the twin variants of the MSM material. The crystallographic short axis of the MSM element tends to align along the direction of compression. In the 10M martensitic structure of Ni—Mn—Ga alloys, for example, the crystallographic short axis is the easy direction of magnetization. Therefore, when this material is compressed, its magnetic permeability increases in the direction of compression.

Deformation or strain can be detected with MSMA materials using the reverse effect. It has been shown that the reverse effect is substantially linear, as discussed in more detail below. Even stronger than the effect on magnetization is the effect of twin orientation on the magnetic permeability. Strains in MSM alloys are based on changes of the proportions of twin variants. Thus, strain developed in MSMA-implanted elastic materials can be detected as a change in magnetic permeability induced by the strain. When an MSM element is strained, twins in favorable orientation with respect to the direction of stress grow at the expense of other twins. For instance, those twin variants that have a short crystallographic axis along the direction of compression grow at the expense of the other variant(s). Under a tensile stress, the variants having a long crystallographic axis along the direction of tensile stress grow.

The strain sensor disclosed herein uses the inductance of a coil wound around the transducer to measure the change in magnetic permeability with strain. Referring to FIGS. 1A and 1B, in a one dimensional strain sensor embodiment, the sensor body 10 has an axis 12. A first drive coil 14 and first sensor coil 16 are wound around the body about the first axis, one over the other. The drive coil 14 is coupled to a power source 18 and the first sensor coil 16 is coupled to a receiving device 20, whether directly or remotely, via a wireless connection. The receiving device 20 can be a computer or other device that is programmed to recognize and analyze electrical currents induced in the first sensor coil 16. The power source and receiving device can both be part of a single device, such as a computer.

The first drive coil 14 is configured to generate an alternating magnetic field on the body 10. This alternating magnetic field naturally induces a corresponding current in the first sensor coil 16. However, the characteristics of this induced current will vary with changes in the magnetic permeability of the sensor body 10. Thus, the first sensor coil 16 will detect changes in inductance of the body 10 due to changes in magnetic permeability of the body with deformation relative to the axis 12 of strain. These changes in inductance will be received and analyzed by the receiving device 20, allowing characteristics of the strain to be determined. The signal of the first pick-up coil can be translated into a stress value by applying Hooke's law using known elastic properties of the sensor body.

A variety of MSMA materials can be used in a sensor in as disclosed herein, including nickel-manganese-gallium (Ni—Mn—Ga), iron-palladium (Fe—Pd), iron-platinum (Fe—Pt) and cobalt-nickel-gallium (Co—Ni—Ga). Those of skill in the art will understand that MSMA materials are characterized by twin variants in the crystal structure. One variant has its short crystallographic axis oriented perpendicular to the direction of applied mechanical strain, while the other adjacent variant has its short axis parallel to the direction of applied mechanical strain. If the axis of strain is in a direction of easy magnetization, as is the case for 10M martensite in Ni—Mn—Ga alloys, when the sample is compressed along this axis, it becomes easier to be magnetized along this direction, and when the element is elongated along this axis, it becomes harder to be magnetized along this direction. An increase of the ease of magnetization also means an increase of magnetic permeability.

If the MSMA element is placed inside a coil, the coil's inductance changes when the magnetic permeability in the direction of the coil's axis changes. For 10M martensite, the magnetic permeability of a fully compressed element, i.e. an element with only one twin variant, is over 100 times greater than the magnetic permeability of the fully elongated element.

FIG. 1B illustrates the principle of the strain sensor in one dimension. The sensor coil 16 is wound around the MSM element 10 in such a way that the axis of the coil is substantially parallel to the strain axis 12 of the MSM element. When the MSM element is compressed, inductance of the coil increases due to the increased magnetic permeability along the axis of the coil. Because twins of the MSM element are thin, the change of magnetic permeability is smooth. The magnetic permeability change is proportional to the strain in that direction. Because the magnetic inductance of the coil is proportional to the permeability of the MSM element, the inductance is also proportional to the strain of the MSM element. Inductance changes can be measured using only one coil, but in FIGS. 1A and 1B, two coils are shown, the drive coil 14 and the pick-up or sensor coil 16 for detecting the changes in magnetic permeability.

It has been found that changes in inductance due to changes in magnetic permeability with strain of an MSMA material via the reverse effect are substantially linear. This characteristic is shown in FIG. 2. This graph shows changes in inductance of a sample of MSMA material with changes in strain (in arbitrary units). The two lines of the graph indicate change in inductance relative to the strain of the MSM element, both during compression indicated by the lower line 22, and tension or elongation, indicated by the upper line 24. Experimental measurements made using a coil set similar to FIGS. 1A and 1B reveal that inductance increases about 6% with a fully elongated (along the first axis) MSMA element under tension, and inductance increases about 70% with a fully compressed (along the first axis) element, when compared to the inductance when no element is positioned inside a pick-up or sensor coil. The larger change of inductance measured with the fully compressed element is believed to be due to the short crystallographic axis being aligned parallel to the coil.

Advantageously, the strain sensor principles shown and described above with respect to FIGS. 1A and 1B can be applied to more than one dimension. Two and three-dimensional strain sensors can be configured according to the principles of this disclosure. Shown in FIG. 3 is a perspective view of an embodiment of a sensor 100 for sensing strains in three orthogonal directions. A piece of MSM material 110, hereafter referred to as an MSM element, is surrounded by three sets of coils 112, 114, 116 (each set including a drive coil and a sensor coil) oriented substantially perpendicular or orthogonal to each other, about the x, y and z axes, respectively. As discussed above, when the MSM element is strained, its magnetic permeability varies, depending on the direction of strain, due to reorientation of the twin variants of the MSM material. The crystallographic short axis of the MSM element tends to align along the direction of compression, so that its magnetic permeability increases in the direction of compression. This permeability change is detected by a change in magnetic inductance along the three coils wound around the MSM element in three orthogonal directions.

Because they are orthogonal to each other and because the variation in magnetic permeability (and therefore inductance) of the MSMA material depends on the direction of compression, the three sensor coils 112, 114 and 116 monitor the x, y and z normal strain components of the strain tensor. The strain is proportional to the volume fraction of each twin variant, and so is the distribution of the axis of easy magnetization. Therefore, the inductance is in first order proportional to the strain.

Because they are orthogonal to each other, the drive and pick-up coils do not cross-talk if there is no shear strain, i.e. the drive coil wound around the x direction does not give rise to a signal in the pick-up coils wound around the y and z directions, and similarly for the other drive coils. However, if there is a shear strain imposed on the sensor, the three sets of coils are no longer mutually orthogonal and the drive coil wound around the x direction does give rise to a signal in the pick-up coils wound around the y and z directions, and similarly for the other drive coils. This signal is a measure for the respective shear strain component. In particular, when the x drive coil is activated, the signal detected by the pick-up coil wound around the y direction provides a measure for the first contribution to the xy shear strain component. The second contribution to the xy shear strain component is obtained by activating the y drive coil and reading the signal of the x pick-up coil. Similarly, the other shear strain components can be obtained. The signals of the pick-up coils can be translated into the complete stress tensor by applying the generalized Hooke's law and known elastic constants of the sensor.

The outer drive coil of each coil set produces an alternating magnetic field along the length of the element 110. The inner coil is the sensor or pick-up coil. The current source for the drive coil can include a signal generator with a lock-in amplifier. The pick-up signal is received by the sensor coil and can be detected with a lock-in amplifier associated with the receiving device. The pick-up voltage is proportional to the strain. A computer device, such as a laptop computer 118, can provide both a current source and be a receiving device for the sensor device 100. The laptop computer can be connected to the drive and sensor coils of the sensor device 100, and can provide driving power to the drive coils, and can receive and analyze the sensor data from the sensor coils. As shown in FIG. 3, the sensor device can be directly connected to the computer device by a hardwire connection, or it can be wirelessly connected.

The 3D strain sensor according to this disclosure is composed of an MSM element and three coil sets placed substantially perpendicular to each other, as illustrated in FIG. 3. The coils detect strains in three directions. In FIG. 3, coil 112 detects strains along the x direction, coil 114 detects strains along the y direction, and coil 116 detects strains along the z direction. Straining of the element in one direction produces signals to two other perpendicular coils. This does not disturb the measurements, because this can be taken into account using appropriately calibrated software. The inductance of the coils can be measured using a continuous alternating signal, or by short pulses.

In another embodiment, also illustrated with reference to FIG. 3, instead of using a drive coil and a sensor coil for each axis of sensing, a single coil can be used. That is, coils 112, 114, and 116 can be individual coils and not coil sets. Rather than having separate drive and sensor coils (e.g. 14 and 16 in FIG. 1B), each single coil can be actuated with an AC voltage, and the resultant AC current in that same coil will be recorded as the response. The computer 118 can provide the AC voltage to the coils, and also receive and evaluate the response current. Alternatively, a separate AC voltage source can be coupled to the coils, while the current is sensed by the computer 118 or the like. The phase shift between the current signal and the drive voltage provides a measurement of the coil inductance, and is taken as a measure for the strain of the sensor. This approach can be used for one, two, three, or any number of coils. While this approach involves more signal evaluation and signal processing of the response signal, it can simplify the design and fabrication of the sensor device while still providing the desired output. Those of skill in the art will recognize that the inductance change can be determined in other ways, such as by measuring the magnitude of the output signal.

Advantageously, the sensor element can be MSMA material cast or embedded in an elastic resin. The MSMA element of the strain sensor can be a single crystal, a polycrystalline foam, or a composite that is composed of MSMA material particles, flakes or fibers embedded in an elastic media, hereafter known as an MSMA-elastomer composite. MSMA spheres can also be used. The single crystalline MSMA element(s) or the polycrystalline foam MSMA element(s) can also be embedded in an elastic media. In one embodiment, the MSMA particles or fibers are randomly dispersed in a molten or uncured rubber polymer, for example, which is formed into a sheet. Individual sensor elements of a desired size can then be cut from the sheet, and the respective the coil sets in the x, y and z directions can then be wound around the element. In one embodiment, the individual sensor elements are less than 1 cm square.

Alternatively, the coil sets can be placed around the individual MSMA elements in within the elastic media. The MSMA-elastomer composite can be a uniform elastic media, and the coil sets can be dispersed uniformly over the MSMA-elastomer composite.

Figure 4:
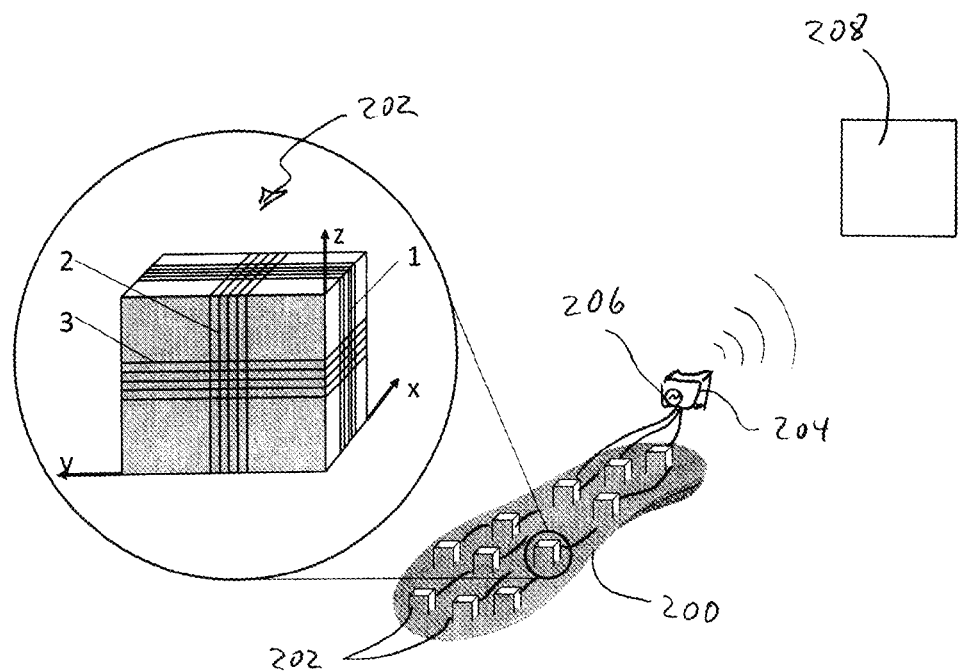
FIG. 4 is a perspective view of an embodiment of a shoe insole having multiple MSMA sensors disposed therein, in accordance with the present disclosure.

Advantageously, 3-axial stress and/or strain detection can be applied in a wide variety of applications where tracking of motion and/or stress is important. One example of an application for this type of stress/strain sensor is a shoe insole that detects stress in x, y and z directions in different locations of the sole during biped motor activities such as standing, walking and running. Shown in FIG. 4 is a perspective view of an embodiment of a shoe insole 200 having multiple MSMA sensors 202 disposed therein. The insole can include a controller device 204 that is connected to each of the sensors, and includes a power source 206 (e.g. batteries) for the drive coils of each sensor and a receiver device (e.g. a microprocessor) for the sensor input. The controller device 204 can be attached to a shoe or to the leg of a wearer of a shoe containing the insole, for example. Advantageously, the control device can include a wireless transmitter which is in wireless communication with another receiver device 208, such as a computer system, allowing sensor data to be transmitted for viewing and analysis. In another embodiment, the controller device 204 can include memory for storing sensor data over time, and can include means for directly connecting the controller to a computer or other receiver device 208 on a periodic basis, to download the sensor data for analysis.

Figure 5:
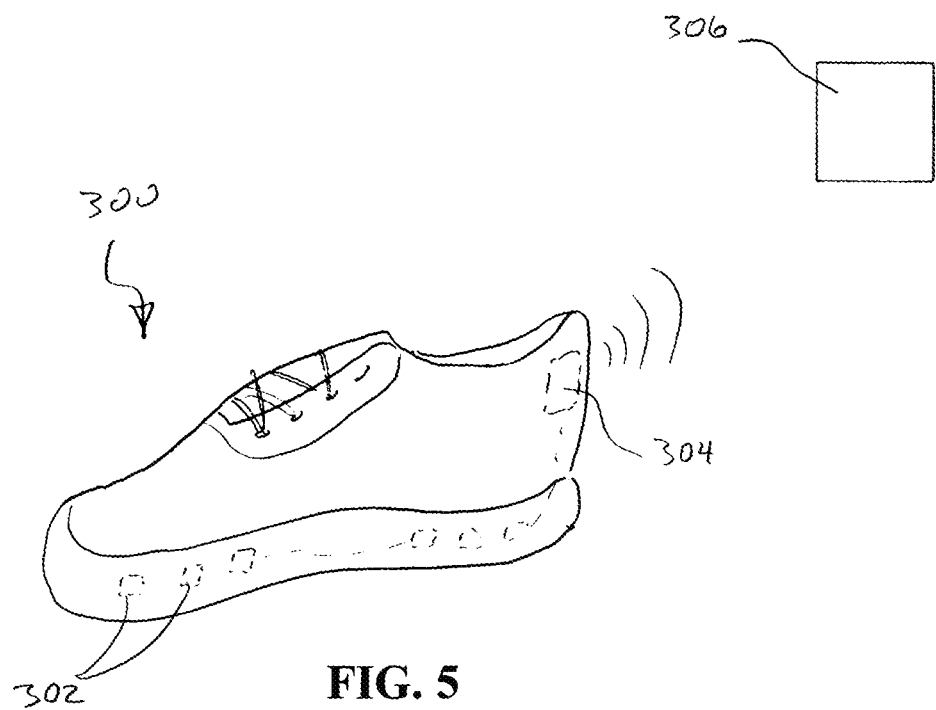
FIG. 5 is a side view of a shoe having a wireless MSMA sensor system, in accordance with the present disclosure.

In addition to a shoe insole, an entire shoe can be provided with sensors as disclosed herein. Shown in FIG. 5 is a side view of a shoe 300 having a wireless MSMA sensor system, including a number of sensors 302 in accordance with the present disclosure, coupled to a controller device 304 that allows wireless transmission of sensor data to a receiver 306, as discussed above.

Figure 6:
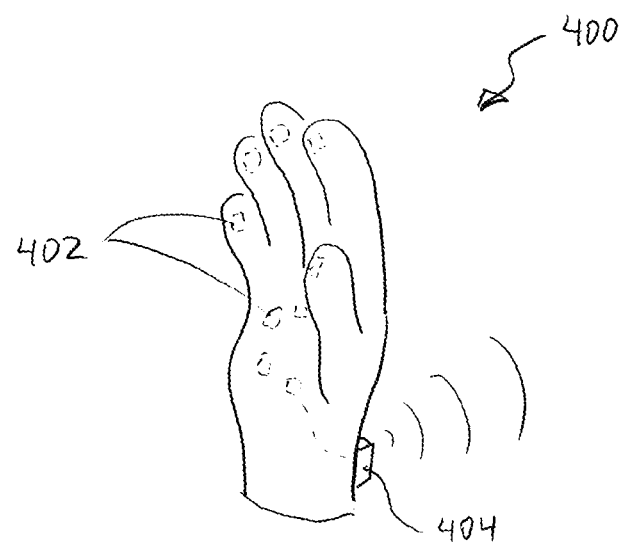
FIG. 6 is a side view of a glove having an MSMA sensor system, in accordance with the present disclosure.

In addition to shoes, a sensor in accordance with the present disclosure can be associated with a wide variety of other uses, including gloves, haptic sensors of various kinds (e.g. for control of robotic devices), cars, car seats, biomechanical devices, flight-related devices, etc. Shown in FIG. 6 is a glove 400 having an MSMA sensor system, in accordance with the present disclosure. As with the shoe and insole embodiments discussed above, this embodiment includes multiple sensor elements 402 embedded in an elastic media in various points in the glove, such as the finger tips and the palm. A wireless transmitter device 404 can be attached to the back of the glove for transmitting sensor data to a receiver device (not shown).

The apparatus disclosed herein can thus be understood as providing a sensor element including a magnetic shape-memory alloy (MSMA) material. MSMA materials include at least one element made from a material having at least two twin variants of different crystallographic directions with different lattice parameters. The MSMA material has a magnetic permeability that is different in the different crystallographic directions. It is desirable that the mechanical strain energy for this material be relatively high with respect to the energy required to grow a twin variant of one crystallographic direction at the expense of another twin variant(s).

At least one coil set, which can include one coil or three coils wound around the element(s) in substantially orthogonal directions, is disposed around the MSMA element. The coil(s) and the element can be embedded in an elastic media, such that the mechanical deformation (strain) of the element changes the inductance of the three coils that reveal the three substantially perpendicular (x, y, z) strain components of the element.

In one embodiment, the shortest crystallographic axis of the MSMA material can be the easy direction of magnetization. In another embodiment, the longest crystallographic axis of the MSMA material can be the easy direction of magnetization. In another embodiment, the element can be a single crystalline material. In yet another embodiment, the element can be a polycrystalline foam. In other embodiments, the elements can be single crystalline or polycrystalline particles, flakes or fibers dispersed in an elastic media. A variety of MSMA materials can be used. In one embodiment, the sensor element includes an alloy that contains nickel, manganese and gallium.

In one embodiment, the sensor device is integrally formed with a wearable item, such as a shoe or glove. Multiple sensor devices can be distributed or embedded in an elastic media that forms part of the wearable item, such as a shoe sole, a shoe insole, or a glove.

This device can increase the understanding of musculoskeletal mechanical loading and motor patterns in some cases where collecting GRF data is currently very difficult. This allows a new testing and analysis method that uses 3D force sensors to obtain GRFs virtually anywhere. It allows the use of 3D force sensors that can be attached to the body, instead of depending on external structures and facilities. This can enable uninterrupted and unconstrained reaction force measurements, even outside of a laboratory setting. In particular, 3D insole force sensors can replace floor-embedded force platforms for detecting foot and leg-related forces during walking or running. Insole sensors make it feasible to measure GRF during various biped motor activities that researchers may never have analyzed, or during continuous long-term activity. Other sensors embodied in other devices can also be developed for examining 3D reaction forces at different body segments.

In addition, 3D insole sensors in accordance with this disclosure can enable clinicians and physical therapists without access to a laboratory having a force-platform to objectively analyze and evaluate loading conditions related to lower-limb musculoskeletal injury and disease. Such data could increase diagnosis and treatment plan quality. Furthermore, accurate insole force sensors that are easy to use without expensive and bulky lab equipment are also suitable for continuous load monitoring. Clinicians could use the data to educate patients to adjust their muscle excitation and motor control. Such inexpensive therapeutic interventions can reduce treatment costs for certain prevalent injuries and diseases.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. An apparatus for sensing strain, comprising:
   an elastic body of magnetic shape-memory alloy (MSMA) material, having a first axis, the MSMA material including at least one element made from a material having at least two twin variants of different crystallographic directions with different lattice parameters, the MSMA material having magnetic permeability different in the different crystallographic directions;
   a first drive coil, wound around the body about the first axis, coupled to a power source and configured to generate an alternating magnetic field on the body; and
   a first sensor coil, wound around the body about the first axis, configured to detect changes in inductance of the body due to changes in magnetic permeability of the body with deformation thereof.

2. An apparatus in accordance with claim 1, wherein the first drive coil and the first sensor coil comprise a single coil.

3. An apparatus in accordance with claim 1, wherein the MSMA material comprises an elastomeric material having MSMA particles integrally disposed therein.

4. An apparatus in accordance with claim 3, wherein the MSMA particles are selected from the group consisting of nickel-manganese-gallium, iron-palladium, iron-platinum and cobalt-nickel-gallium.

5. An apparatus in accordance with claim 3, wherein the MSMA particles are selected from the group consisting of randomly oriented elongate fibers, substantially orthogonally oriented elongate fibers and spheres.

6. An apparatus in accordance with claim 3, wherein the elastomeric material comprises a rubber polymer.

7. An apparatus in accordance with claim 1, wherein the elastic body comprises a polycrystalline MSMA foam that is impregnated with elastic polymer material.

8. An apparatus in accordance with claim 1, wherein one of the shortest and longest crystallographic axes is an easy direction of magnetization.

9. An apparatus in accordance with claim 1, further comprising a transmitter, coupled to the first sensor coil, configured to wirelessly transmit strain data to a receiving device.

10. An apparatus in accordance with claim 1, wherein the body of MSMA material is substantially cubic, and has a side dimension of less than about 1 cm.

11. An apparatus in accordance with claim 1, further comprising:
    second and third drive coils, wound around the body about second and third axes thereof, respectively, coupled to the power source and configured to generate an alternating magnetic field on the body, the first, second and third axes being oriented substantially perpendicular to each other; and
    second and third sensor coils, wound around the body about the second and third axes, respectively, configured to detect changes in inductance of the body due to changes in magnetic permeability of the body with deformation thereof.

12. An apparatus in accordance with claim 11 wherein the first drive coil and first sensor coil comprise a single coil, the second drive coil and second sensor coil comprise a single coil, and the third drive coil and third sensor coil comprise a single coil.

13. A strain-sensing device, comprising:
    a plurality of sensor elements, integrally disposed in the device, each sensor element comprising:
       a body of MSMA-elastomer composite material, having a first axis;
       a first drive coil, wound around the body about the first axis, coupled to a power source and configured to generate an alternating magnetic field on the body;
       a first sensor coil, wound around the body about the first axis, configured to detect changes in inductance of the body due to changes in magnetic permeability of the body with deformation thereof; and
    a transmitter, coupled to the plurality of sensor elements, configured to transmit strain data from the plurality of sensor elements to a receiving device.

14. A strain-sensing device in accordance with claim 13, further comprising:

second and third drive coils, wound around the body about second and third axes thereof, respectively, coupled to the power source and configured to generate an alternating magnetic field on the body, the first, second and third axes being oriented substantially perpendicular to each other; and second and third sensor coils, wound around the body about the second and third axes, respectively, configured to detect changes in inductance of the body due to changes in magnetic permeability of the body with deformation thereof.

15. A strain-sensing device in accordance with claim 13 wherein the device is wearable.

16. A strain-sensing device in accordance with claim 15, wherein the wearable strain-sensing device is selected from the group consisting of a shoe, a shoe insole and a glove.

17. A strain-sensing device in accordance with claim 13, wherein the body of MSMA-elastomer composite material comprises MSMA particles distributed in an elastomer.

18. A strain-sensing device in accordance with claim 17, wherein the MSMA material is selected from the group consisting of nickel-manganese-gallium, iron-palladium, iron-platinum and cobalt-nickel-gallium.

19. A stress sensing device, comprising
a plurality of sensor elements, integrally disposed in a device, each sensor element comprising:
a body of MSMA-elastomer composite material, having a first axis;
a first drive coil, wound around the body about the first axis, coupled to a power source and configured to generate an alternating magnetic field on the body;
a first sensor coil, wound around the body about the first axis, configured to detect changes in inductance of the body due to changes in magnetic permeability of the body with deformation thereof and
a transmitter, coupled to the plurality of sensor elements, configured to transmit strain data from the plurality of strain elements to a receiving device.

20. A stress-sensing device in accordance with claim 19, further comprising:
second and third drive coils, wound around the body about second and third axes thereof, respectively, coupled to the power source and configured to generate an alternating magnetic field on the body, the first, second and third axes being oriented substantially perpendicular to each other; and
second and third sensor coils, wound around the body about the second and third axes, respectively, configured to detect changes in inductance of the body due to changes in magnetic permeability of the body with deformation thereof.

21. A stress-sensing device in accordance with claim 19, wherein the device is wearable and is selected from the group consisting of a shoe, a shoe insole and a glove.

22. A stress-sensing device in accordance with claim 19, wherein the body of MSMA-elastomer composite material comprises MSMA particles distributed in an elastomer.

23. A stress-sensing device in accordance with claim 22, wherein the MSMA material is selected from the group consisting of nickel-manganese-gallium, iron-palladium, iron-platinum and cobalt-nickel-gallium.

24. A method for making a strain sensor, comprising:
embedding an MSMA material in an elastic medium by dispersing single crystalline or polycrystalline particles, flakes or fibers in the elastic medium;
wrapping a first drive coil and a first sensor coil around a part of the elastic medium about a first axis;
connecting the first drive coil to an alternating current source; and
connecting the first sensor coil to circuitry for sensing changes in inductance of the first sensor coil, said changes being indicative of strain of the elastic medium relative to the first axis.

25. A method in accordance with claim 24, further comprising:
wrapping second and third drive coils and sensor coils, respectively, around the part of the elastic medium, about second and third axes, the first, second and third axes being substantially orthogonal;
connecting the second and third drive coils to the alternating current source; and
connecting the second and third sensor coils to the circuitry for sensing changes in inductance, said changes being indicative of strain of the elastic medium relative to the second and third axes.

26. A method in accordance with claim 24, wherein embedding the MSMA material in an elastic medium comprises embedding the MSMA material in one of a shoe sole, a shoe insole and a glove.

27. A force sensing device, comprising
a plurality of sensor elements, integrally disposed in a device that is wearable by a person, each sensor element comprising:
a body of MSMA-elastomer composite material, having a first axis;
a first drive coil, wound around the body about the first axis, coupled to a power source and configured to generate an alternating magnetic field on the body; and
a first sensor coil, wound around the body about the first axis, configured to detect changes in inductance of the body due to changes in magnetic permeability of the body with deformation thereof.

28. A force-sensing device in accordance with claim 27, further comprising:
second and third drive coils, wound around the body about second and third axes thereof, respectively, coupled to the power source and configured to generate an alternating magnetic field on the body, the first, second and third axes being oriented substantially perpendicular to each other; and
second and third sensor coils, wound around the body about the second and third axes, respectively, configured to detect changes in inductance of the body due to changes in magnetic permeability of the body with deformation thereof.

29. A force-sensing device in accordance with claim 27, further comprising a transmitter, coupled to the plurality of sensor elements, configured to transmit strain data from the plurality of strain elements to a receiving device.

30. A force-sensing device in accordance with claim 27, wherein the wearable device is selected from the group consisting of a shoe, a shoe insole and a glove.

31. A force-sensing device in accordance with claim 27, wherein the body of MSMA-elastomer composite material comprises MSMA particles distributed in an elastomer.

32. A force-sensing device in accordance with claim 31, wherein the MSMA material is selected from the group consisting of nickel-manganese-gallium, iron-palladium, iron-platinum and cobalt-nickel-gallium.

* * * * *